United States Patent
Yeh (10) Patent No.: US 10,154,574 B2
(45) Date of Patent: Dec. 11, 2018

(54) MULTIFUNCTIONAL SMART HOME LAMP CONTROL AND SECURITY REMOTE CONTROL SIGNAL RECEIVER

(71) Applicants: G-Light Technologies Co., Ltd., Tainan (TW); TGM Technology Co., Ltd., New Taipei (TW)

(72) Inventor: Ting-Kuang Yeh, Tainan (TW)

(73) Assignees: G-Light Technologies Co., Ltd., Tainan (TW); TGM Technology Co., Ltd., New Taipei (TW)

( * ) Notice: Subject to any disclaimer, the term of this patent is extended or adjusted under 35 U.S.C. 154(b) by 0 days.

(21) Appl. No.: 15/787,760

(22) Filed: Oct. 19, 2017

(65) Prior Publication Data

US 2018/0228008 A1    Aug. 9, 2018

(30) Foreign Application Priority Data

Feb. 8, 2017   (TW) .............................. 106201847 U (51) Int. Cl.
| | |
|---|---|
| F21S 8/02 | (2006.01) |
| H05B 37/02 | (2006.01) |
| F21V 29/83 | (2015.01) |
| H05B 33/08 | (2006.01) |
| F21V 21/26 | (2006.01) |
| G08B 13/22 | (2006.01) |

(52) U.S. Cl.
CPC .......... *H05B 37/0272* (2013.01); *F21S 8/026* (2013.01); *F21V 21/26* (2013.01); *F21V 29/83* (2015.01); *H05B 33/089* (2013.01); *G08B 13/22* (2013.01)

(58) Field of Classification Search
CPC .... F21S 8/026; F21V 23/005; F21V 23/0435; F21V 23/0442; F21V 23/045; F21V 23/06; F21V 5/048; H05B 33/0803; H05B 37/0227; H05B 37/0272
USPC ........................................................ 362/253
See application file for complete search history.

(56) References Cited

U.S. PATENT DOCUMENTS

| | | | |
|---|---|---|---|
| 2005/0090915 A1* | 4/2005 | Geiwitz ................. | G05B 15/02 700/90 |
| 2015/0338077 A1* | 11/2015 | Johnson ................ | F21V 23/005 362/234 |
| 2017/0238401 A1* | 8/2017 | Sadwick ............ | H05B 37/0281 315/294 |

(Continued)

*Primary Examiner* — Seung H Lee
(74) *Attorney, Agent, or Firm* — Alan D. Kamrath; Kamrath IP Lawfirm, P.A.

(57) ABSTRACT

A multifunctional smart home lamp control and security remote control signal receiver is embedded in the ceiling and displays a plurality of lamp control display zones, a sensing display zone, a sound zone, human body sensors and a sensing adjustment zone and/or camera recorders by facing downward so that a user can easily watch the lamp control status or the security displayed by the LED display lamp on the remote control receiver. A rear surface is disposed with an electric zone having a plurality of wire sockets, a fuse zone and an electrifying zone. The electrifying zone is provided for introducing supply mains, and power is provided to a plurality of lamps through the wire sockets of the electric zone to provide the multifunctional smart home lamp control and security remote control signal receiver for simultaneously handing lamp control status and security status in the home life.

9 Claims, 10 Drawing Sheets

(56) References Cited

U.S. PATENT DOCUMENTS

2017/0328997 A1\* 11/2017 Silverstein ............ G01S 13/886

\* cited by examiner

MULTIFUNCTIONAL SMART HOME LAMP CONTROL AND SECURITY REMOTE CONTROL SIGNAL RECEIVER

BACKGROUND OF THE INVENTION

Field of the Invention

The present invention relates to a home lamp control and security remote control signal receiver and, more particularly, to a multifunctional smart home lamp control and security remote control signal receiver embedded in the ceiling to have advantages of convenient mounting and clearly displaying the lamp control and security state by a sound alert, thereby facilitating inspection and repairing and providing quick understanding status.

Description of the Related Art

A house may be equipped with a system device regarding home life convenience and safety, and the system device that is frequently seen is a "lamp control system device" and a "security system device". Taking the "lamp control system device" in a house as an example, inside and outside of a house are usually mounted with different kinds of light emitting lamps to provide sufficient illuminance for indoor and outdoor environments by disposing different kinds of light emitting members therein. Generally, circuits disposed in different kinds of light emitting lamps would be equipped with a "lamp control switch" for controlling the light-up or put-off of the light emitting members in the light emitting lamp. The "lamp control switch" can be a "wall lamp control switch" disposed on a wall and can be frequently seen. Luminance lamps in a building are usually disposed at a relatively higher height (such as ceilings), and lamp control switches, through wire connection, are disposed at places where users' hands can easily touch so that a convenient operating height can be at relatively lower places (door side walls for example). Some cases integrate and mount a plurality of lamp control switches into the same place (for instance: shopping malls or offices) through a wire connection, thereby conveniently carrying out a lamp control operation at the same time.

The wall lamp control switch utilizes wires (power lines) to perform remote control and is an operating mode of a "wired control lamp control switch". The wall lamp control switch, in daily life, becomes the frequently used lamp control switch under long term use habits and is a conventional and important lamp control appliance. The configuration relationship between the wired control lamp control switch and the light emitting lamps is that a light emitting lamp corresponds to a lamp control switch to ensure safety. Some may adopt several (two or three) light emitting lamps to co-use a lamp control switch for operation. More particularly, in places using many light emitting lamps, such as shopping malls, convenient stores, factories, offices, etc., the same control area is equipped with many lamp control switches. In addition, some places divide a large scope into many small scopes, and each small scope has an independent lamp control operating time or sequence, and one person (lamp control person or guard for example), on time, must perform the lamp control operation within each different small scope. Therefore, the person, every day, must walk to the lamp control switch places within each different small scope on time to carry out the lamp control operation for the small scope, resulting in inconvenience.

Figure 1:
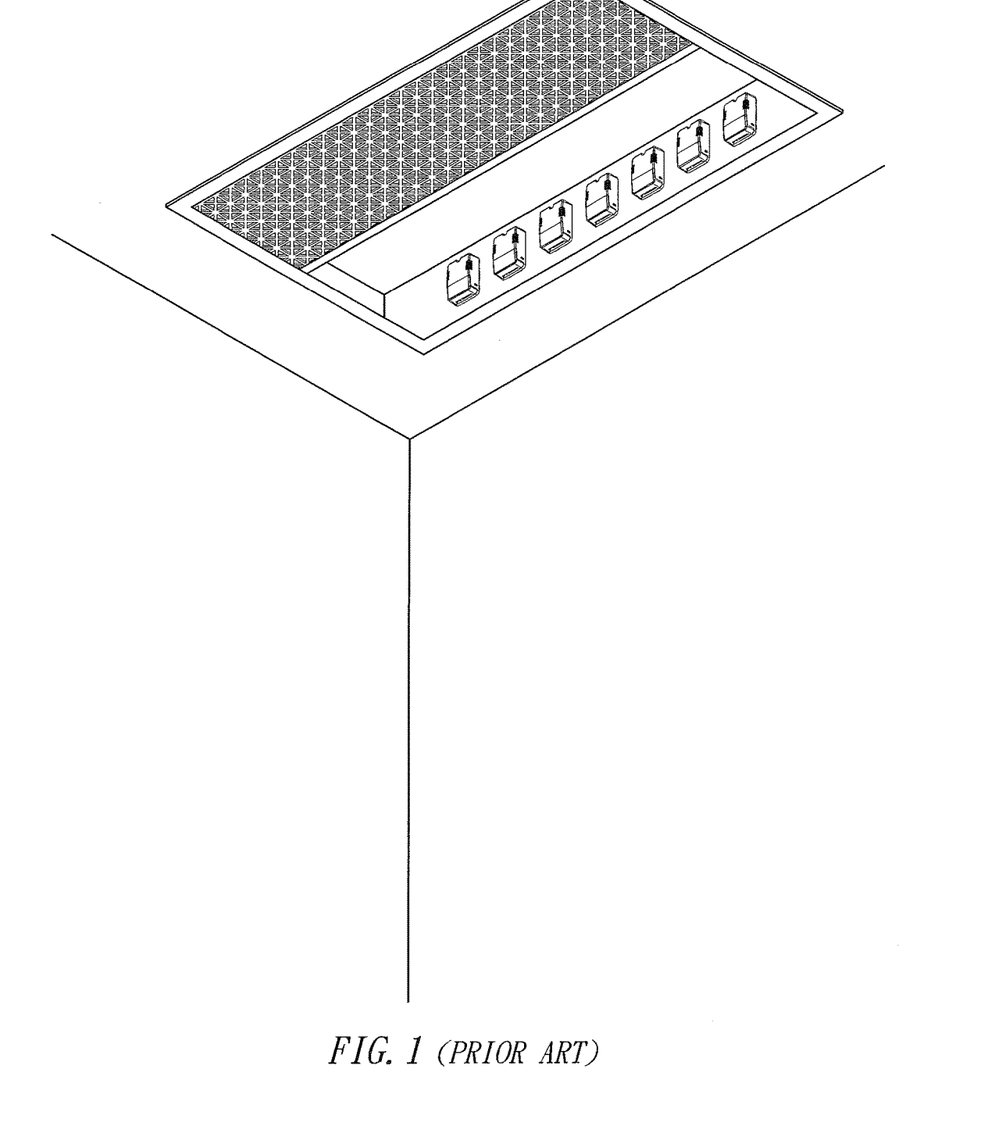
FIG. 1 is a schematic diagram of mounting a conventional lamp controlling remote control signal receiver.

Since the wired control lamp control switch is not convenient, a lamp control wireless remote control system comes out. Generally, a wireless remote control signal is emitted by a "lamp control remote control", and a "remote control signal receiver" electrically connected to a light emitting lamp remotely receiving the wireless remote control signal. After the signal is logically calculated by the internal circuit of the remote control signal receiver, the circuit control is correspondingly performed on the controlled light emitting lamp to allow the light emitting lamp to achieve motion of remotely lighting-up or remotely putting out. The remote control signal receiver in the lamp control wireless remote control system is mounted near the light emitting lamp to smoothly and stably receive the wireless remote control signal emitted by the lamp control remote control switch. Normally, concerning consistency of building remodeling or landscape, remote control signal receivers in the same space are co-mounted at the height and in hidden positions. Moreover, such remote control signal receivers can be hidden through remodeling so that people may not see it within a line of sight. For example, FIG. 1 is a schematic diagram of a plurality of remote control signal receivers concentrated and mounted in a maintenance hole of a ceiling (the maintenance hole cover plates shown in the figure are partially retracted to expose the inside of the maintenance hole). The foregoing design may facilitate the beauty for the entire space but is not good for mounting. To make matters worse, when a malfunction of the lamp control operation occurs to require inspection and repairing work, these mounted lamps are not easily seen. Generally, when light emitting members inside the light emitting lamps are in malfunction, lamp control remote control switches that are easily touched are firstly inspected to determine whether it has no power or is in malfunction. If the lamp control remote control switch is in a normal condition through inspection, both light emitting members and the remote control signal receivers shall be inspected. More particularly, the remote control signal receiver must be firstly inspected to determine whether or not it normally works. If the remote control signal receiver normally works after inspection, it determines that the light emitting member is in malfunction. However, when the remote control signal receiver is inspected, an actual connection relationship between each remote control signal receiver and each light emitting member is not easily recognized from the lower side due to each remote control signal receiver being concentrated and mounted at the height. Even if all remote control signal receivers at the height are exposed (as shown in FIG. 1), by way of pressing the lamp control remote control switch, a repairing person at lower side is unable to directly recognize which remote control signal receiver corresponding to the light emitting member that gives a very bad light is. Consequently, simple inspection of determining whether or not the remote control signal receiver normally works is not carried out at the lower side.

In addition to the correspondingly malfunctioning remote control signal receiver that is not easily recognized from the lower side, while completing the initial wiring, is the corresponding relation between each remote control signal receiver and each light emitting member correct? Similarly, it is difficult to perform simple inspection at the lower side, since the remote control signal receiver is concentrated and mounted at the height. Generally, while initially completing the wiring, a wiring worker must press a "lamp control remote control switch" to test correctness of the "remote control signal receiver" and the light emitting member. However, when one of the light emitting members does not correctly (normally) work in accordance with the lamp control remote switch that is pressed, a wiring worker must climb up to the place of concentrating the remote control signal receivers to test one by one. Simple inspection of determining whether or not the remote control signal receiver normally works is not carried out at the lower side. An issue of easily mounting the remote control signal receiver and of clearly displaying the actual status of the lamp control operation any time to conveniently inspect and repair is really important.

Not only is the "lamp control system device" in everyday domestic life paid much attention, but also the "security system device" is important. A security system device relates to different kinds of living safety such as a door/window anti-theft inspection, a door/window explosion prevention inspection, personal access sensing, gas concentration detection, abnormal gas concentration detection, etc. Disposing reed detectors on edges of doors/windows and disposing pressure sensors on doors/windows are frequently seen, and theses detectors and sensors are connected to a control host to perform an anti-theft detection and explosion prevention inspection for the house windows/doors. The inspection result is displayed through sound or light. At the same time, human body sensors are disposed at access ways and are connected to the control host to carry out a safety detection for gas concentration or abnormal gas concentration in houses. The detection result is further displayed through sound or light. The reed detector, the pressure sensor, the human body sensor, and the gas concentration detector illustrated herein must be connected to the control host, and detection sensitivity and affecting time can be changed through adjustment. Therefore, the foregoing can be the so called "security system device". Generally, such appliances of the reed detector, the pressure detector, the human body sensor, and the gas concentration detector are usually mounted at unobvious region locations of a house and are frequently ignored or forgot. Upon the foregoing, clearly displaying the actual status of the security system device any time to facilitate understanding and inspecting/repairing is really important thing as well as the lamp control system device.

SUMMARY OF THE INVENTION

In view of the aforementioned drawbacks of the prior art, a specific receiver in accordance with the present invention overcomes the drawbacks of the prior art.

Therefore, it is an objective of the present invention to provide a multifunctional smart home lamp control and security remote control signal receiver embedded in a ceiling and conveniently mounted and capable of clearly displaying the affecting state to check and repair and to quickly understand the situation.

To achieve the above mentioned objective, the present invention is to develop a multifunctional smart home lamp control and security remote control signal receiver, with a front face of the receiver having a circle panel, with the circle panel disposed with at least a lamp control display zone, and with the lamp control display zone having a LED display lamp and a control key. Two sides of a rear face of the receiver are respectively disposed with an elastic engagement member engaged at an engagement table and capable of being deflected, with its internal edge being a circular engagement wall, with a host table raised from an inside, with a circuit device disposed inside the host table, and with at least an electric zone, a fuse zone and an electrifying zone disposed at a periphery. The electric zone has wire sockets in which its quantity is the same as the lamp control display zone and is provided for respectively connecting bare junctions of different positive pole wires to allow the different positive pile wires to electrically connect the circuit device inside the host table. The electric zone is inserted by a power line extended from supply mains and is locked and fastened to introduce the supply mains to the circuit device.

The circle panel of the above mentioned multifunctional smart home lamp control and security remote control signal receiver is further disposed with a sensing display zone, a human body sensor and a sensing adjustment zone, and the sensing display zone has a LED display lamp and a control key.

The circle panel of the above mentioned multifunctional smart home lamp control and security remote control signal receiver is further disposed with a sound zone.

The human body sensor of the above mentioned multifunctional smart home lamp control and security remote control signal receiver is electrically connected to one of the electric zones.

The sensing adjustment zone of the above mentioned multifunctional smart home lamp control and security remote control signal receiver is disposed to adjust a sensing distance, a sensing time and a sensing intensity of the human body sensor.

The circle panel of the above mentioned multifunctional smart home lamp control and security remote control signal receiver is further disposed with a video recorder.

The present invention is further a multifunctional smart home lamp control and security remote control signal receiver, with a front face of the receiver having a circle panel, and with the circle panel disposed with at least a sensing display zone, a human body sensor and a sensing adjustment zone. Two sides of a rear face of the receiver is respectively disposed with an elastic engagement member engaged at an engagement table and is capable of being deflected, with its internal edge being a circular engagement wall, with a host table raised from an inside, with a circuit device disposed inside the host table, and with at least an electric zone, a fuse zone and an electrifying zone disposed at a periphery. The electric zone has wire sockets in which its quantity is the same as the lamp control display zone and is provided for respectively connecting bare junctions of different positive pole wires to allow the different positive pile wires to electrically connect the circuit device inside the host table. The electric zone is inserted by a power line extended from supply mains and locked and fastened to guide the supply mains to the circuit device.

The host table of the above mentioned multifunctional smart home lamp control and security remote control signal receiver is disposed with a plurality of heat dissipation holes to achieve ventilation and heat dissipation to reduce the working temperature inside the host table.

DETAILED DESCRIPTION OF THE PREFERRED EMBODIMENTS

The technical characteristics, contents, advantages and effects of the present invention will be apparent with the detailed description of preferred embodiments accompanied with related drawings as follows.

Figure 2:
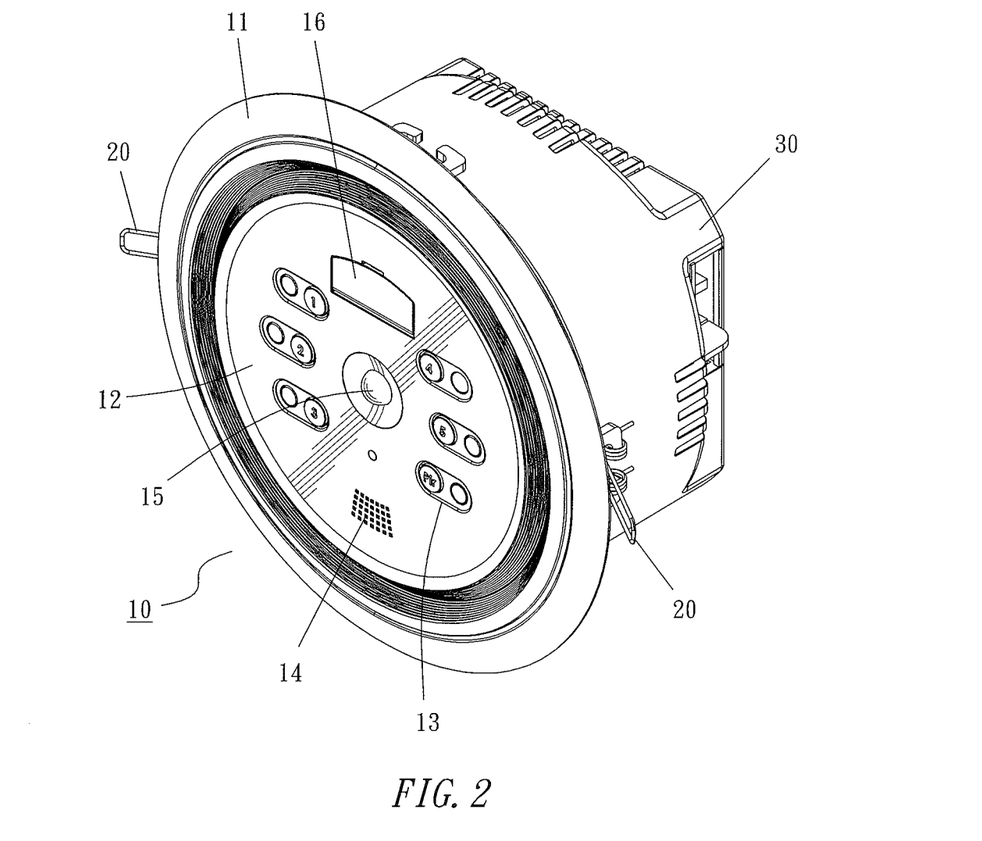
FIG. 2 is a three-dimensional drawing of a front view according to a first embodiment of the present invention.
Figure 3:
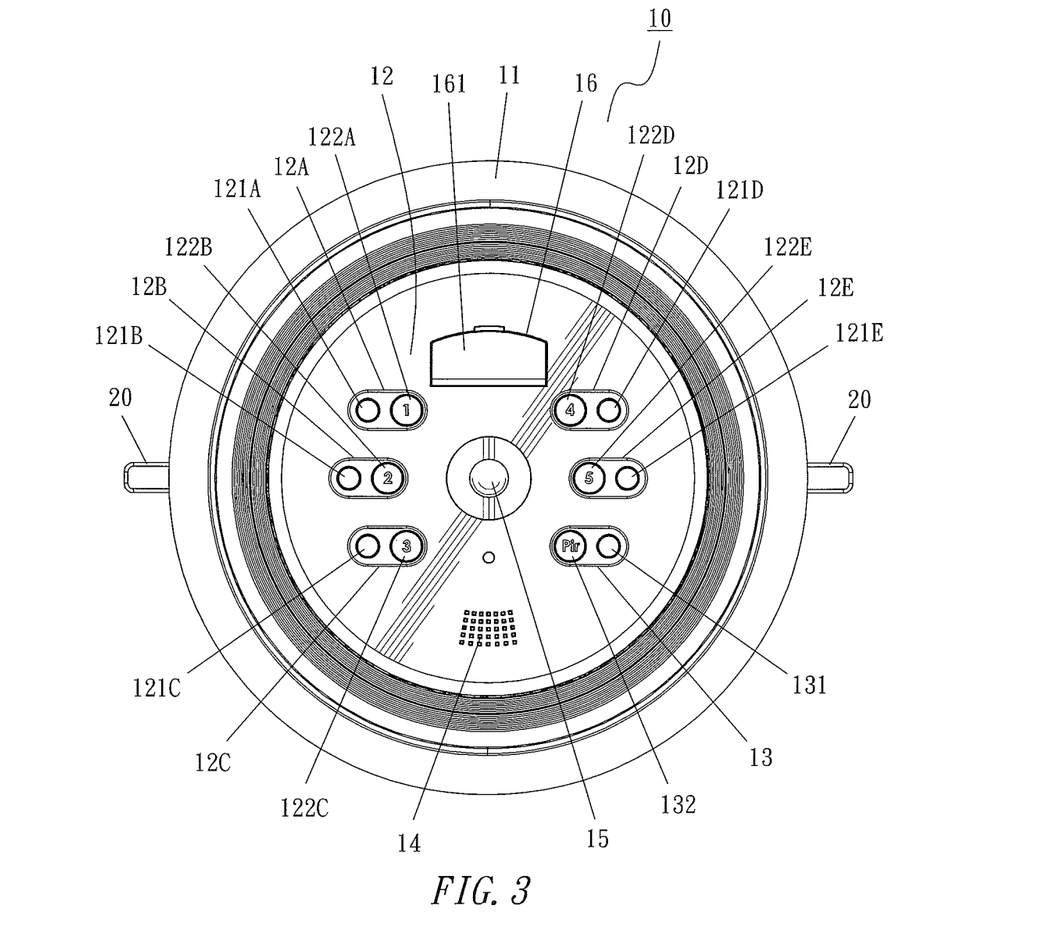
FIG. 3 is an elevational drawing according to the first embodiment of the present invention.
Figure 4:
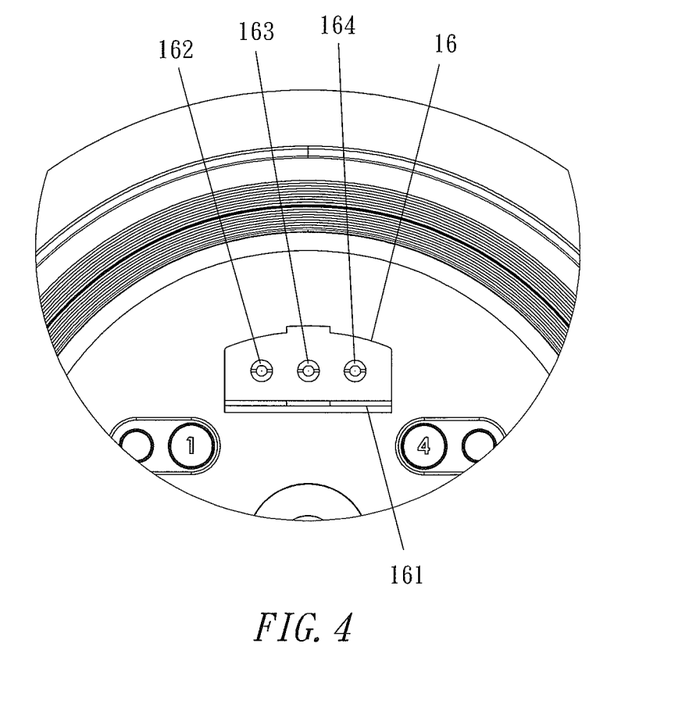
FIG. 4 is a schematic diagram of an internal structure of a sensing adjustment according to the first embodiment of the present invention.

With reference to FIGS. 2-4 for a remote control signal receiver 10 according to a first embodiment of the present invention, the remote control signal receiver 10 can incorporate with a home lamp control system apparatus and can also incorporate with a home security system apparatus. As shown in FIG. 2, the front of the structure of the remote control signal receiver 10 has a circle panel 11. The circle panel 11 is disposed with a plurality of lamp control display zones 12, a sensing display zone 13, a sound zone 14, a human body sensor 15 and a sensing adjustment zone 16. In the present invention, the lamp control display zone 12 is disposed with five sets, and each lamp control display zone 12 has a LED display lamp and a control key. Accordingly, as shown in FIG. 3, it can be divided into a first lamp control display zone 12A having a first LED display lamp 121A and a first control key 122A, a second lamp control display zone 12B having a second LED display lamp 121B and a second control key 122B, a third lamp control display zone 12C having a third LED display lamp 121C and a third control key 122C, a fourth lamp control display zone 12D having a fourth LED display lamp 121D and a fourth control key 122D, and a fifth lamp control display zone 12E having a fifth LED display lamp 121E and a fifth control key 122E.

The sensing display zone 13 has a LED display lamp 131 and a control key 132. The control key 132 is a Pir human body sensed control key. The inside of the sound zone 14 is preset with a pronunciation device capable of pronouncing sound (the sound of reminder and/or warning) by penetrating the surface slit. The human body sensor 15 can be a Pir sensor capable of sensing moving motion of the human body. However, the human body sensor 15 is controlled by the control key 132 of the sensing display zone 13 to determine whether or not the sensing effect exists and to decide the sensing degree of the sensing effect. The setting and sensing effect among the control key 132, the human body sensor 15 and the light emitting lamps will be illustrated in detail. The sensing adjustment zone 161 is to open or close the surface through a cover body 161. While lifting the cover body 16 at ninety degrees, as shown in FIG. 4, a sensing distance adjustment knob 162, a sensing time adjustment knob 163 and a sensing intensity adjustment knob 164 are disposed therein to respectively adjust the sensing distance (the sensing distance for moving motion), sensing time (the affecting time after sensing) and sensing intensity (the sensing intensity for a beam) of the human body sensor 15.

Figure 5:
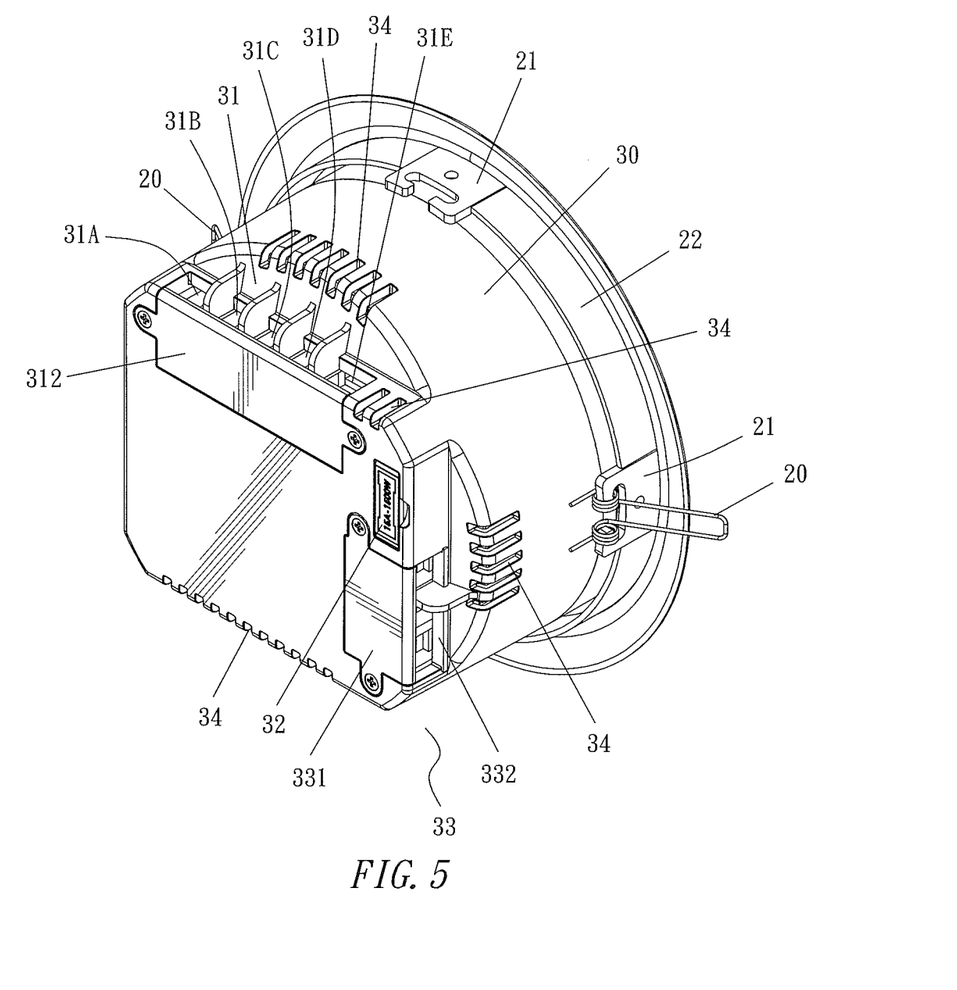
FIG. 5 is a three-dimensional drawing of a rear view according to an embodiment of the present invention.
Figure 6:
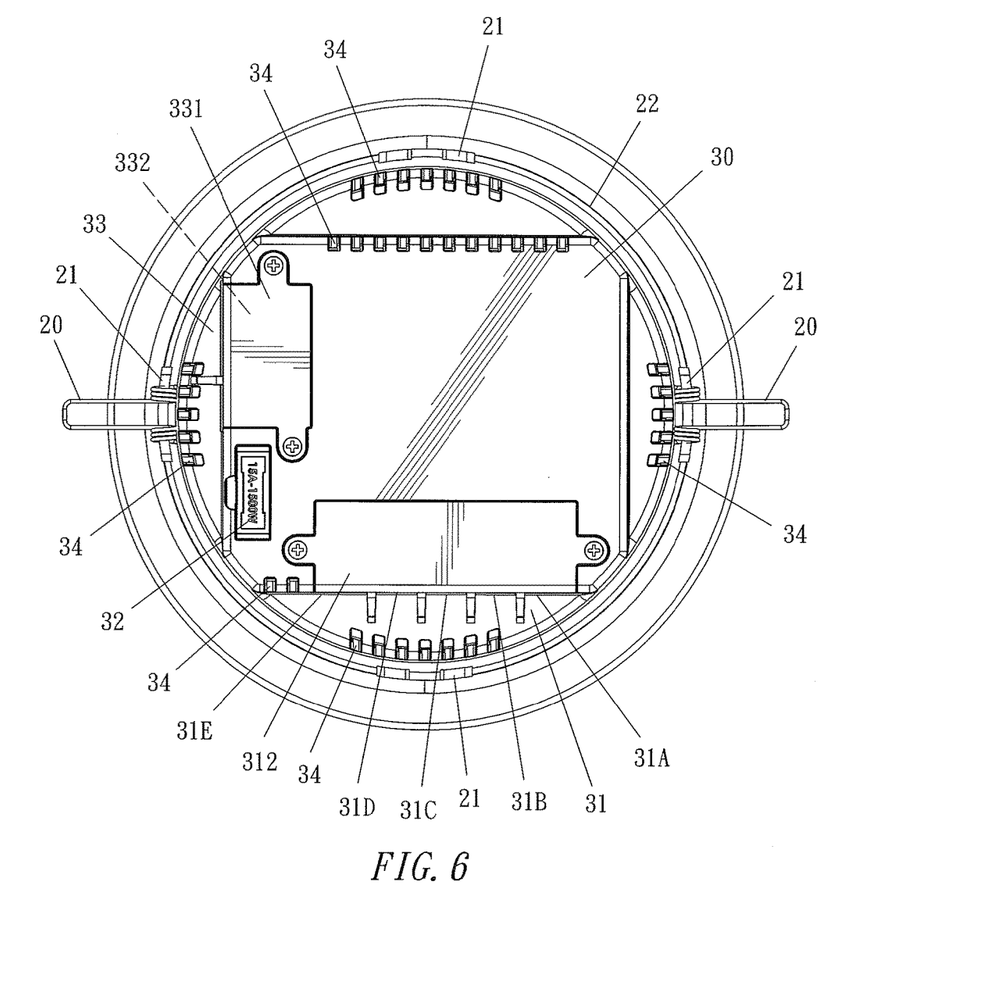
FIG. 6 is a rear view drawing according to an embodiment of the present invention.
Figure 7:
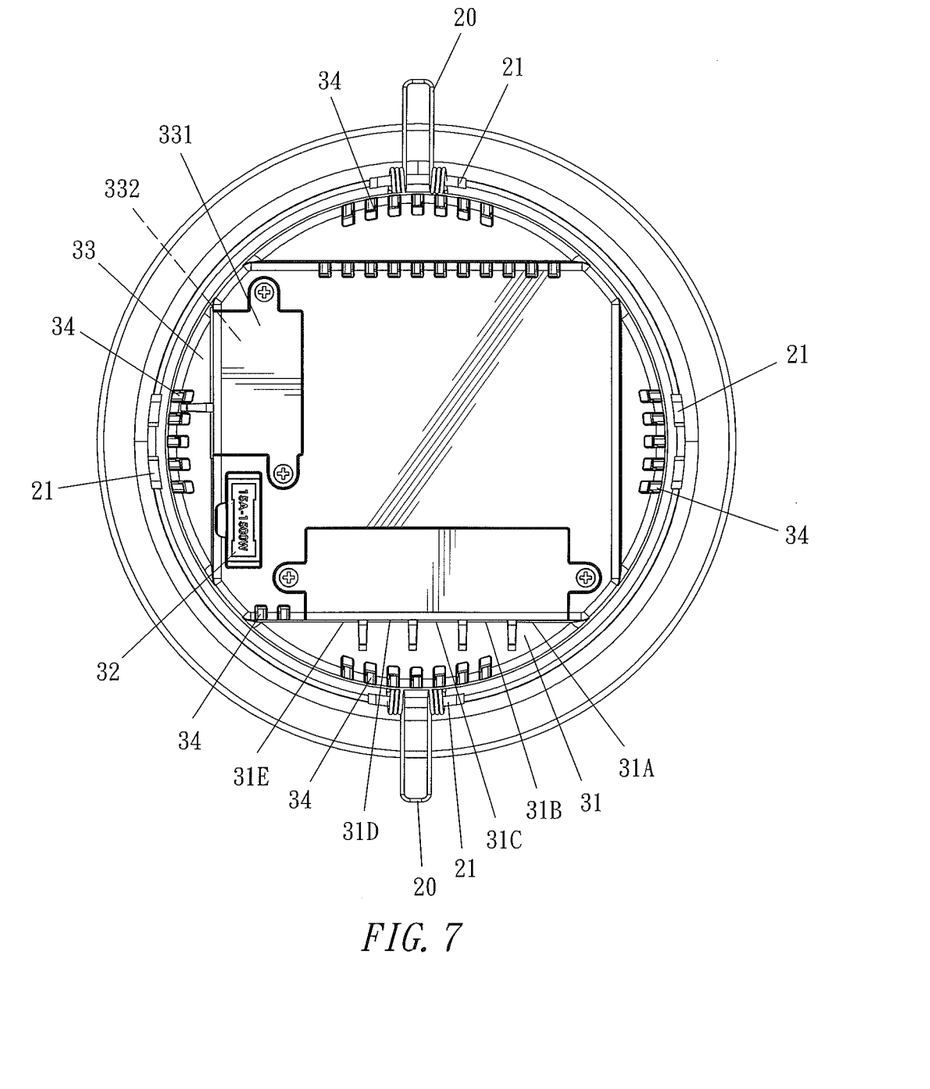
FIG. 7 is a rear view drawing of changing an elastic engagement member according to the embodiment of the present invention.

With reference to FIGS. 5-7, an elastic engagement member 20 is respectively disposed at two sides of the rear of the remote control signal receiver 10 and is respectively engaged at an engagement table 21 under straight line symmetry to generate an elastic engagement force while deflecting the elastic engagement member 20. Therefore, the rear of the remote control signal receiver 10 can be spaced at ninety degree to form an engagement table 21 (a total of four engagement tables 21 as shown in FIGS. 6, 7). Two sets of engagement tables 21 as a straight line intersection are formed, so that a mounting person can select one of two sets of engagement tables 21 to respectively engage with the two elastic engagement members 20 (as shown in FIG. 6), and positions of the two elastic engagement members 20 are changed to engage with another set of engagement tables 21 (as shown in FIG. 7) when necessary. Accordingly, under the circumstance of not changing the front position of the circle panel 11 of the remote control signal receiver 10, the position of the two elastic engagement members 20 is changed to generate a proper engagement effect. A circular engagement wall 22 is formed by co-surrounding between the engagement tables 21, and a host 30 is raised toward the inside. The inside of the host 30 is disposed with a required circuit device (not shown in the figure). An electric zone 31 is disposed at a side of the circumference. The top surface is disposed with a fuse zone 32, and its side is disposed with an electrifying zone 33. The circuit device disposed inside the host 30 is electrically connected to the plurality of lamp control display zone 12, the sensing display zone 13, the sound zone 14, the human body sensor 15, the sensing adjustment zone 16, the electric zone 31, the fuse zone 32 and the electrifying zone 33. The inside of the electric zone 31 is partitioned to have a first wire socket 31A, a second wire socket 31B, a third wire socket 31C, a fourth wire socket 31D and a fifth wire socket 31E, in which the quantity is the same as the lamp control display zone 12. The first wire socket 31A can be inserted by a bare junction of a positive pole wire to achieve fastening (it can adopt fastening such as engagement, screwing or riveting), so that the positive pole wire is electrically connected to the circuit device inside the host 30 through the first wire socket 31A. Under the same effect, the second, third, fourth, and fifth wire sockets 31B, 31C, 31D, 31E are respectively inserted by bare junctions of other different positive pole wires to achieve fastening, such that the positive pole wires are electrically connected to the circuit device inside of the host 30. Afterward, a cover plate 312 is co-screwed from the top to cover the joining place of the bare ends of the positive pole wires to prevent the mounting person or the user from accidently suffering electric shock.

The electrifying zone 33 has a cover plate 331 and a set of three hole site type wire socket sets 332 facing the side. The cover plate 331 can release its fastening and connection to be upwardly lifted to expose the wire socket set 332. Two predetermined hole sites of the wire socket set 332 are respectively inserted by the bare ends of the power line two poles extended from the supply mains to achieve fastening (It can adopt fastening such as such as engagement, screwing or riveting). The third hole site can be inserted by the grounding wire to achieve fastening. Accordingly, the power line and the grounding wire are electrically connected to the circuit device inside the host 30, and the supply mains are introduced to the inside of the circuit device. Finally, the cover plate 331 is covered to cover the wire socket set 332. The fuse zone 32 is electrically connected to the circuit device inside the host 30, and its primary function is to protect electricity consumption of the power line extended from the supply mains within a rated range to control the home appliance safety of the electrifying zone 33. The host 30 is additionally disposed with a plurality of heat dissipation holes 34 to achieve ventilation and heat dissipation, thereby reducing the working temperature inside the host 30.

Figure 8:
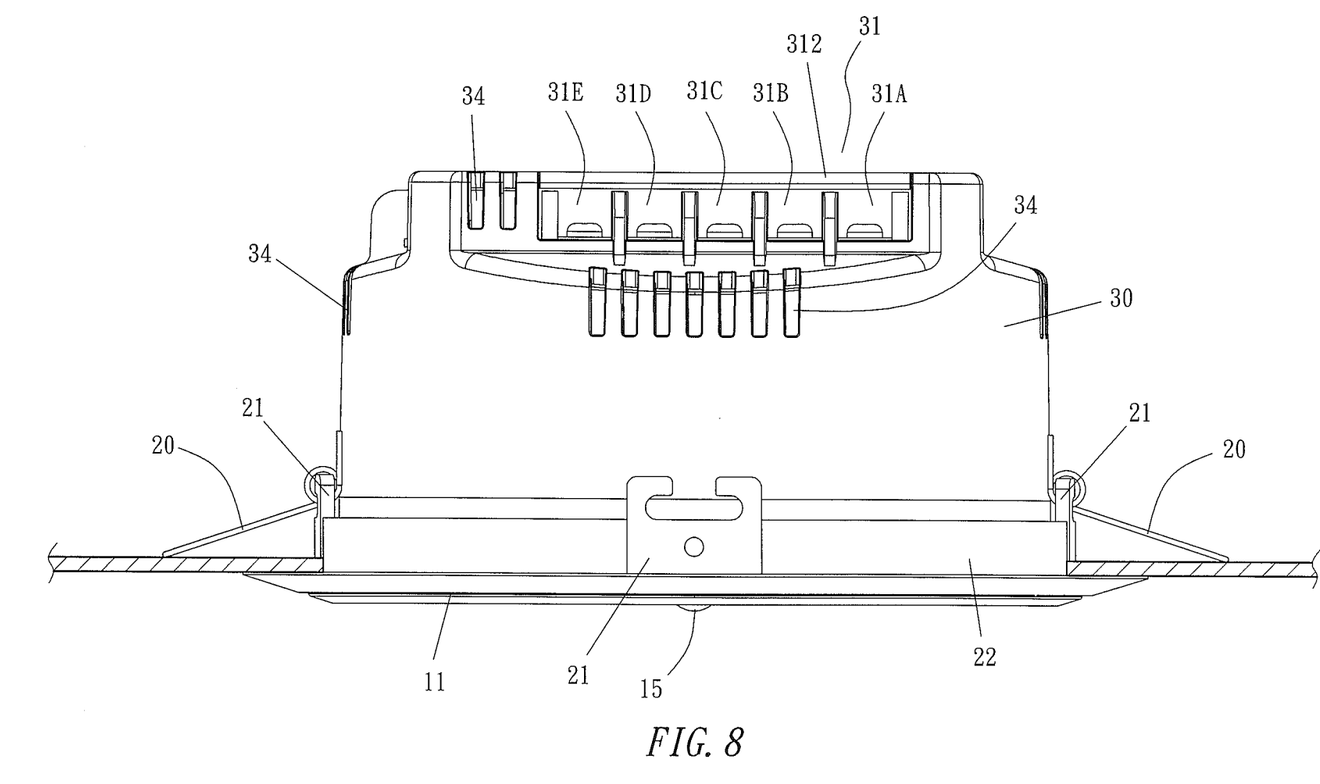
FIG. 8 is a schematic diagram of mounting the receiver in a mounting hole of the ceiling according to the embodiment of the present invention.

While mounting the remote control signal receiver 10, the ceiling must be firstly preserved with a mounting hole in which an internal diameter is equivalent to an internal diameter of the circular engagement wall 22. Afterward, a mounting person can wire the bare end of the positive pole wires of a plurality of light emitting lamps at a remote site from the space above the ceiling to connect the first wire socket 31A, the second wire socket 31B, the third wire socket 31C, the fourth wire socket 31D and the fifth wire socket 31E of the electric zone 31 in the remote control signal receiver 10 one by one, and the power line extended from the supply mains is connected to the electrifying zone 33. Finally, as shown in FIG. 8, the elastic engagement members 20 (the engagement table 21 to be engaged is firstly selected) at two sides of the remote control signal receiver 10 are firstly and upwardly flipped within a range of the circular engagement wall 22. Afterward the remote control signal receiver 10 is accommodated in the mounting hole from down to top until the circular engagement wall 22 is engaged in the mounting hole, and the circle panel 11 upwardly leans against the ceiling. During the process, and since the elastic engagement member 20 is not received with force, it is downwardly deflected under a self-elastic effect to further obliquely prop the wall body of an inner circumference of the mounting hole. Thus, under the dual effect of the circular engagement wall 22 engaged in the mounting hole and the elastic engagement member 20 propping the wall body of the inner circumference of the mounting hole, the remote control signal receiver 10 can be stably mounted in the mounting hole, and the circle panel 11 and the plurality of lamp control display zones 12, the sensing display zone 13, the sound zone 14, the human body sensor 15 and the sensing adjustment zone 16 are exposed and face toward the lower direction. The existence of the remote control signal receiver 10 can be seen when a user slightly raises his/her head. Accordingly, the mounting of the remote control signal receiver 10 can be completed.

Figure 9:
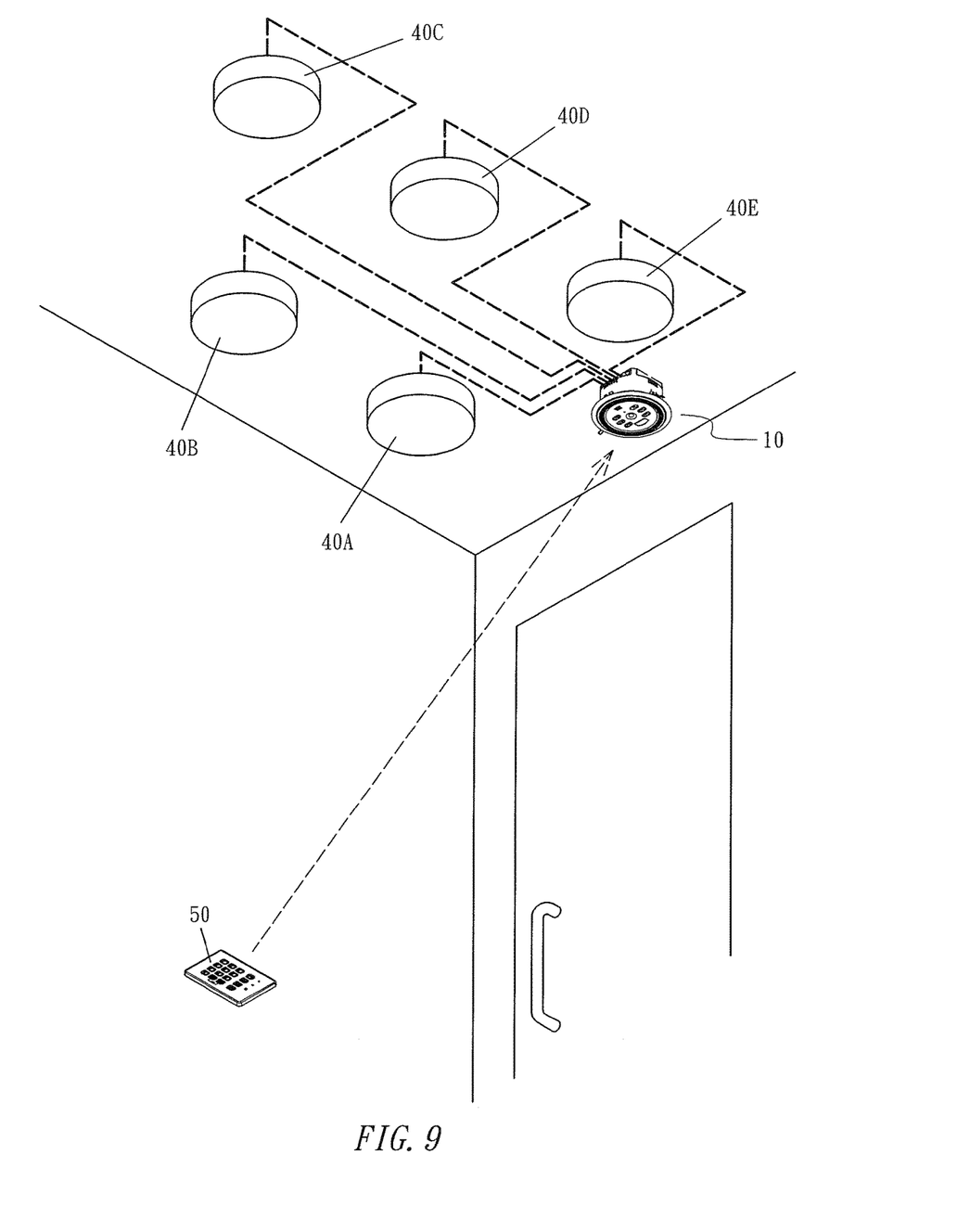
FIG. 9 is an assembled schematic diagram of mounting the receiver among a plurality of lamps at height according to the embodiment of the present invention.

While using the remote control signal receiver 10, the first wire socket 31A, the second wire socket 31B, the third wire socket 31C, the fourth wire socket 31D and the fifth wire socket 31E of the electric zone 31 can be provided for connecting the bare junction of the positive pole wire of the plural light emitting lamps at the remote site to provide the supply mains to the plurality of light emitting lamps. The "light emitting lamps" described herein can be a singular number and can also be plural (light emitting lamp sets). Therefore, "a plurality of light emitting lamps" can be "plural singular light emitting lamp" and can also be "plural majority of light emitting lamps" and can be "plural singular light emitting lamps together with plural majority of light emitting lamps". The electrical connection state between the remote control signal receiver 10 and the plurality of light emitting lamps mounted to the height place is shown in FIG. 9. The first wire socket 31A, the second wire socket 31B, the third wire socket 31C, the fourth wire socket 31D and the fifth wire socket 31E of the electric zone 31 of the remote control signal receiver 10 are respectively provided for conducting the bare junctions of the positive pole wires of a light emitting lamp 40A, a light emitting lamp 40B, a light emitting lamp 40C, a light emitting lamp 40D and a light emitting lamp 40E.

While using the lamp control, two operating manners of "manual wireless lamp control mode" and "automatic wireless lamp control mode" can be selected and set at the remote control signal receiver 10. While selecting the "manual wireless lamp control mode", the remote control signal receiver 10 must be firstly paired with another remote control switch 50 regarding remote control signals. A key on the panel of the remote control switch 50 is selected and pressed, and at the same time, a control key (the first control key 122A; and so on and so forth) on the lamp control display zone 12 (the first lamp control display zone 12A; and so on and so forth) corresponding to a wire jack (the first wire socket 31A for example; and so on and so forth) selected on the electric zone 31 of the remote control signal receiver 10 is pressed. Both internal circuit devices of the remote control switch 50 and the remote control signal receiver 10 are compiled to complete logic correspondingly. After completing the remote control signal pairing of wireless lamp control effect, by pressing different keys on the panel of the remote control switch 50, the light emitting lamps 40A or 40B or 40C or 40D or 40E are remotely controlled to achieve control of turning on or turning off. When the lamp control display zone 12 (the first lamp control display zone 12A for example; and so on and so forth) receives the control signal, its LED display lamp (the first LED display lamp 121A; and so on and so forth) is lighted up for a set time and then is put out. At the same time, the setting or stopping can be selected to enable the sound zone 15 to make a predetermined sound (it can be a reminder sound of lighting-up or a greeting sound of kindness).

While selecting the "automatic wireless lamp control mode", the control key (the fifth control key 122E for example; and so on and so forth) on the lamp control display zone 12 (the fifth lamp control display zone 12E for example; and so on and so forth) corresponding to a wire jack (the fifth wire socket 31E for example; and so on and so forth) selected on the electric zone 31 of the remote control signal receiver 10 is pressed. At the same time, the control key 132 on the sensing display zone 13 is pressed. Accordingly, the light emitting lamp (the light emitting lamp 40E for example; and so on and so forth) corresponding to the control key (the fifth control key 122E for example; and so on and so forth) is electrically connected to the human body sensor 15 controlled by the control key 132. When a person accesses a sensing range of the human body sensor 15, the correspondingly light emitting lamp (the light emitting lamp 40E for example; and so on and so forth) would automatically light up. At the same time, the LED display lamp (the fifth LED display lamp 121E for example; and so on and so forth) on the lamp control display zone 12 (the fifth light emitting lamp 40E for example; and so on and so forth) instantly lights up for a set time and is put out. Simultaneously, the setting and stopping can also be selected to allow the sound zone 14 to make a predetermined sound (it can be a reminder sound of lighting-up or a greeting sound of kindness). The effect of the "automatic wireless lamp control mode" is to firstly provide brief illumination when the person enters darkness or at night, so that other lamp control operating can be conveniently carried out while lighting up. Obviously, for example, when the person enters in a normal house, brief illumination can be firstly provided by the correspondingly light emitting lamp through the human body sensor 15 to allow such person in the house to clearly see the house status and to have sufficient time for officially turning on the lamp. When the person in a building exits an elevator, brief illumination can be firstly provided by the correspondingly light emitting lamp through the human body sensor 15 to enable the person exiting the elevator to clearly see home door locks and to have sufficient time for unlocking these locks.

When the "automatic wireless lamp control mode" is selected, the human body sensor 15 controlled by the control key 132 does not merely control the single light emitting lamp. If necessary, the human body sensor 15 can further control the turning-on or turning-off of plural light emitting lamps at the same time. The control keys (the third, fourth and fifth control keys 122C, 122D, 122E for example; and so on and so forth) on the lamp control display zone 12 (the third, fourth and fifth lamp control display zone 12C, 12D, 12E for example; and so on and so forth) corresponding to the selected wire jackets (the third, fourth and fifth wire sockets 31C, 31D, 31E for example; and so on and so forth) are correspondingly connected to the control key 132 one by one. When the person enters the sensing range of the human body sensor 15, all correspondingly light emitting lamps (the light emitting lamps 40C, 40D, 40E for example; and so on and so forth) automatically light up. At the same time, the LED display lamps (the third, fourth and fifth LED display lamps 121C, 121D, 121E for example; and so on and so forth) on the correspondingly lamp control display zone 12 (the third, fourth and fifth lamp control display zones 12C, 12D, 12E for example; and so on and so forth) light up for a setting time and then is off.

While using the lamp control of the remote control signal receiver 10, two operating modes of the "manual wireless lamp control mode" and the "automatic wireless lamp control mode" are provided at the same time. When the light emitting lamps enter automatic lighting-up due to the entrance of the person sensed by the human body sensor 15, the remote control signal receiver 10 can be further utilized to activate the same light emitting lamps, thereby having extreme convenience.

Since the sound zone 14 is electrically connected to the plurality of lamp control display zones 12, the sensing display zone 13 and the circuit device disposed inside the host 30, remote controlled operating signals issued from the remote control switch 50 can be received by the plurality of lamp control display zones 12. Moreover, when the sensing display zone 13 receives the sensing signal issued by the human body sensor 15, motion of lamp control operating or motion of sensing persons approaching can be displayed by cooperating with a predetermined sound. In addition, the sound zone 14 can be further electrically connected to the detection (sensing) appliances (such as reed sensors, pressure sensors, gas concentration sensors and the like) of different kinds of the security system device mounted in the building through learning, so that when the security system device senses abnormal motions (for instance, doors/windows are breached, thieves intrude into houses, and concentration of environmental smoke is too high), the sound zone 14 is triggered to make sound. The person can be reminded to meet a contingency.

Figure 10:
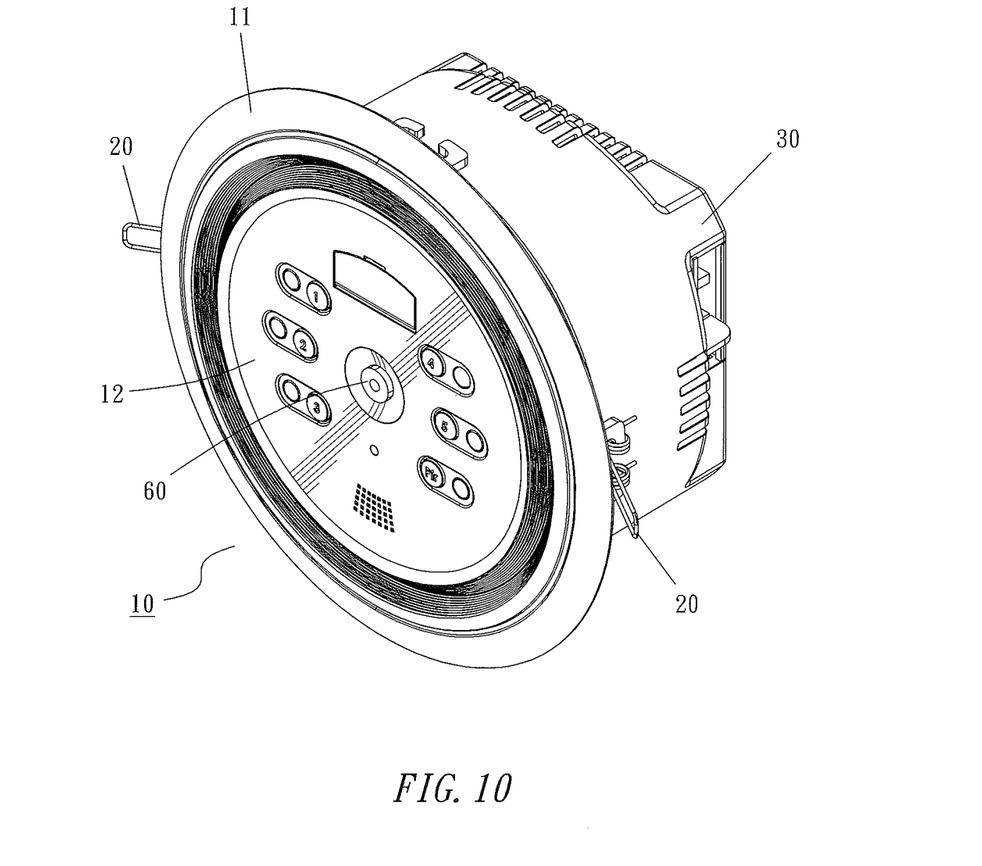
FIG. 10 is a front view three-dimensional drawing according to a second embodiment of the present invention.

Next, FIG. 10 shows a remote control signal receiver 10 according to a second embodiment of the invention. Most of the structures and composition are the same as disclosure in the first embodiment, and the same structure portions are not illustrated herein. The difference between the first embodiment and the second embodiment is that the remote control signal receiver 10 of the second embodiment changes the position of originally disposing the human body sensor 15 to dispose a video recorder 60. In another word, the human body sensor 15 is replaced with the video recorder 60. Moreover, the video recorder 60 is electrically connected to the circuit device disposed inside the host 30. Therefore, with convenience of mounting the remote control signal receiver 10 in the ceiling, not only the remote control signal receiver 10 of the second embodiment has practical convenience of lamp control, but also it can directly carry out video recording within an area scope. When security issues occur, records of videos recorded by the video recorder 60 can be remotely monitored or reviewed to facilitate understanding the whole story.

Upon the foregoing, the greatest advantage of the remote control signal receiver 10 is that the plurality of lamp control display zones 12, the sensing display zone 13, the sound zone 14, the human body sensor 15 and the sensing adjustment zone 16 or the video recorder 60 are exposed and face toward the lower side. Therefore, the user can see the existence of the remote control signal receiver 10 as long as he/she slightly raises his/her head. Moreover, the LED display lamps on the remote control signal receiver 10 can be directly seen to confirm whether or not both are lighted up, thereby performing simple visual inspection for the lamp control system. At the same time, the invention can be taken as a monitor sensing purpose for building security and is a multifunctional smart automatic remote control signal receiver.

While the remote control signal receiver disclosed by the present invention has been described by specific embodiments, numerous modifications and variations could be made thereto by those skilled in the art without departing from the scope and spirit of the invention set forth in the claims.

What is claimed is:

1. A multifunctional smart home lamp control and security remote control signal receiver, with a front face of the receiver having a circle panel, with the circle panel disposed with a lamp control display zone, with the lamp control display zone having a LED display lamp and a control key; wherein two sides of a rear face of the receiver are respectively disposed with an elastic engagement member engaged at an engagement table and capable of being deflected, with an internal edge being a circular engagement wall, with a host table raised from an inside, with a circuit device disposed inside the host table, with an electric zone, a fuse zone and an electrifying zone disposed at a periphery; with the electric zone having wire sockets of a quantity which is the same as the lamp control display zone and provided for respectively connecting bare junctions of different positive pole wires to allow the different positive pole wires to electrically connect the circuit device inside the host table; and wherein the electric zone is inserted by a power line extended from supply mains and locked and fastened to introduce the supply mains to the circuit device.

2. The multifunctional smart home lamp control and security remote control signal receiver of claim 1, wherein the circle panel is further disposed with a sensing display zone, a human body sensor and a sensing adjustment zone, and wherein the sensing display zone has a LED display lamp and a control key.

3. The multifunctional smart home lamp control and security remote control signal receiver of claim 2, wherein the human body sensor is electrically connected to the electric zone.

4. The multifunctional smart home lamp control and security remote control signal receiver of claim 2, wherein a surface of the sensing adjustment zone is covered by a cover body, and a sensing distance adjustment knob, a sensing time adjustment knob and a sensing intensity adjustment knob are disposed in the sensing adjustment zone to respectively adjust sensing distance, sensing time and sensing intensity of the human body sensor.

5. The multifunctional smart home lamp control and security remote control signal receiver of claim 1, wherein the circle panel is further disposed with a sound zone.

6. The multifunctional smart home lamp control and security remote control signal receiver of claim 1, wherein the host table is disposed with a plurality of heat dissipation holes to carry out ventilation and heat dissipation, thereby reducing working temperature inside the host table.

7. The multifunctional smart home lamp control and security remote control signal receiver of claim 1, wherein the circle panel is further disposed with a video recorder.

8. A multifunctional smart home lamp control and security remote control signal receiver, with a front face of the receiver having a circle panel, with the circle panel disposed with a sensing display zone, a human body sensor and a sensing adjustment zone; wherein two sides of a rear face of the receiver are respectively disposed with an elastic engagement member engaged at an engagement table and capable of being deflected, with an internal edge being a circular engagement wall, with a host table raised from an inside, with a circuit device disposed inside the host table, with an electric zone, a fuse zone and an electrifying zone disposed at a periphery; wherein the electric zone has wire sockets respectively connecting bare junctions of different positive pole wires to allow the different positive pole wires to electrically connect the circuit device inside the host table; and wherein the electric zone is inserted by a power line extended from supply mains and locked and fastened to guide the supply mains to the circuit device.

9. The multifunctional smart home lamp control and security remote control signal receiver of claim 8, wherein the host table is disposed with a plurality of heat dissipation holes to achieve ventilation and heat dissipation to reduce working temperature inside the host table.

* * * * *